United States Patent
Nefcy et al.

(10) Patent No.: US 10,207,696 B2
(45) Date of Patent: Feb. 19, 2019

(54) TIMING TRANSMISSION GEARING SHIFTS FOR A HYBRID ELECTRIC POWERTRAIN

(71) Applicant: FORD GLOBAL TECHNOLOGIES, LLC, Dearborn, MI (US)

(72) Inventors: Bernard D. Nefcy, Novi, MI (US); Marvin P. Kraska, Dearborn, MI (US); Daniel S. Colvin, Farmington Hills, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 628 days.

(21) Appl. No.: 14/299,513

(22) Filed: Jun. 9, 2014

(65) Prior Publication Data
US 2015/0353068 A1    Dec. 10, 2015

(51) Int. Cl.
| | |
|---|---|
| *B60W 10/10* | (2012.01) |
| *B60W 30/188* | (2012.01) |
| *B60W 20/30* | (2016.01) |
| *B60W 10/11* | (2012.01) |
| *B60W 10/02* | (2006.01) |
| *B60W 10/06* | (2006.01) |
| *B60W 10/08* | (2006.01) |
| *B60K 6/48* | (2007.10) |
| *B60W 20/40* | (2016.01) |

(52) U.S. Cl.
CPC .......... *B60W 10/10* (2013.01); *B60K 6/48* (2013.01); *B60W 10/02* (2013.01); *B60W 10/06* (2013.01); *B60W 10/08* (2013.01); *B60W 10/11* (2013.01); *B60W 20/30* (2013.01); *B60W 20/40* (2013.01); *B60W 30/188* (2013.01); *B60K 2006/4825* (2013.01); *B60W 2510/06* (2013.01); *B60W 2510/08* (2013.01); *B60W 2540/16* (2013.01); *B60W 2710/02* (2013.01); *B60W 2710/10* (2013.01); *B60W 2710/1005* (2013.01); *Y10S 903/902* (2013.01)

(58) Field of Classification Search
USPC .................................................. 180/65.245
See application file for complete search history.

(56) References Cited

U.S. PATENT DOCUMENTS

| | | | |
|---|---|---|---|
| 7,517,298 B2 | 4/2009 | Ortmann | |
| 7,559,386 B2 | 7/2009 | Gu et al. | |
| 8,315,755 B2 | 11/2012 | Hirata et al. | |
| 8,386,140 B2 | 2/2013 | Tsuda et al. | |
| 2007/0056783 A1* | 3/2007 | Joe | B60K 6/48 180/65.265 |
| 2007/0259755 A1* | 11/2007 | Tanishima | B60K 6/387 477/3 |
| 2008/0125927 A1 | 5/2008 | Gohring et al. | |

(Continued)

FOREIGN PATENT DOCUMENTS

CN            103391869 A       11/2013

*Primary Examiner* — Lail A Kleinman
(74) *Attorney, Agent, or Firm* — David B. Kelley; MacMillan, Sobanski & Todd, LLC

(57) ABSTRACT

A transmission shift is timed for a hybrid electric powertrain as a function of a torque capacity of an electric machine relative to a shifting torque required to change gearings of a transmission. A vehicle is being propelled by the machine, with an engine stopped, when the shift is requested. If the machine has insufficient torque capacity to change transmission gearings, then the shift request is delayed until the engine has started.

11 Claims, 4 Drawing Sheets

(56) References Cited

U.S. PATENT DOCUMENTS

| | | | |
|---|---|---|---|
| 2008/0196952 A1* | 8/2008 | Soliman | B60K 6/48 180/65.25 |
| 2011/0118915 A1* | 5/2011 | Ortmann | B60K 6/48 701/22 |
| 2011/0172862 A1 | 7/2011 | Ortmann et al. | |
| 2011/0246009 A1 | 10/2011 | Hase et al. | |
| 2012/0083385 A1 | 4/2012 | Smith et al. | |
| 2012/0083952 A1 | 4/2012 | Smith et al. | |
| 2012/0265382 A1 | 10/2012 | Nefcy et al. | |
| 2012/0303199 A1 | 11/2012 | Oba et al. | |
| 2013/0060411 A1 | 3/2013 | Kaltenbach | |
| 2013/0124027 A1 | 5/2013 | Tanishima et al. | |
| 2013/0179014 A1 | 7/2013 | Yamazaki et al. | |

* cited by examiner

TIMING TRANSMISSION GEARING SHIFTS FOR A HYBRID ELECTRIC POWERTRAIN

BACKGROUND OF INVENTION

The present invention relates to a method of controlling a hybrid electric automotive powertrain and in particular to a method of timing transmission gearing shifts.

A hybrid electric powertrain of an automotive vehicle may include both an internal combustion engine and an electric machine to provide propulsion. Commonly, while the vehicle is maintaining a constant cruising speed, the powertrain will stop the engine and use only the machine for propulsion. While at the machine only cruising speed, an acceleration request may be made. Meeting the acceleration request may require both restarting the engine and downshifting a transmission.

However, the combination of restarting the engine and downshifting may result in a torque shortage that delays meeting the acceleration request. The torque shortage may reduce drivability by causing a driver of the vehicle to experience a sense of deceleration despite making the acceleration request.

SUMMARY OF INVENTION

An embodiment contemplates a method of controlling a hybrid powertrain. A transmission shift request is received while an electric machine is propelling a vehicle and an engine is stopped. A torque capacity of the machine is determined. Completion of the shift request is timed as a function of the torque capacity relative to a shifting torque required to complete the shift request.

Another embodiment contemplates a method of controlling a hybrid powertrain. A transmission shift request is received while an electric machine is propelling a vehicle and an engine is stopped. A shifting torque to complete the shift request is determined. A torque capacity of the machine is evaluated. The shift request is completed using the machine to change gearings in a transmission when the torque capacity exceeds the shifting torque. Completing the shift request is delayed while starting the engine when the shifting torque exceeds the torque capacity. The shift request is then completed using the machine and started engine to change gearings in the transmission.

Another embodiment contemplates a method of controlling a hybrid powertrain. An acceleration request is received while an electric machine is propelling a vehicle and an engine is stopped. A determination is made that downshifting a transmission and starting the engine are needed to meet the acceleration request. A torque capacity of the machine and a shifting torque required to downshift the transmission by changing transmission gearing are determined. Downshifting the transmission is timed as a function of the torque capacity relative to the shifting torque.

An advantage of an embodiment is that both the starting of the engine and completing of the shift request can be completed without a torque shortage. This improves driveability of the vehicle.

DETAILED DESCRIPTION

Figure 1:
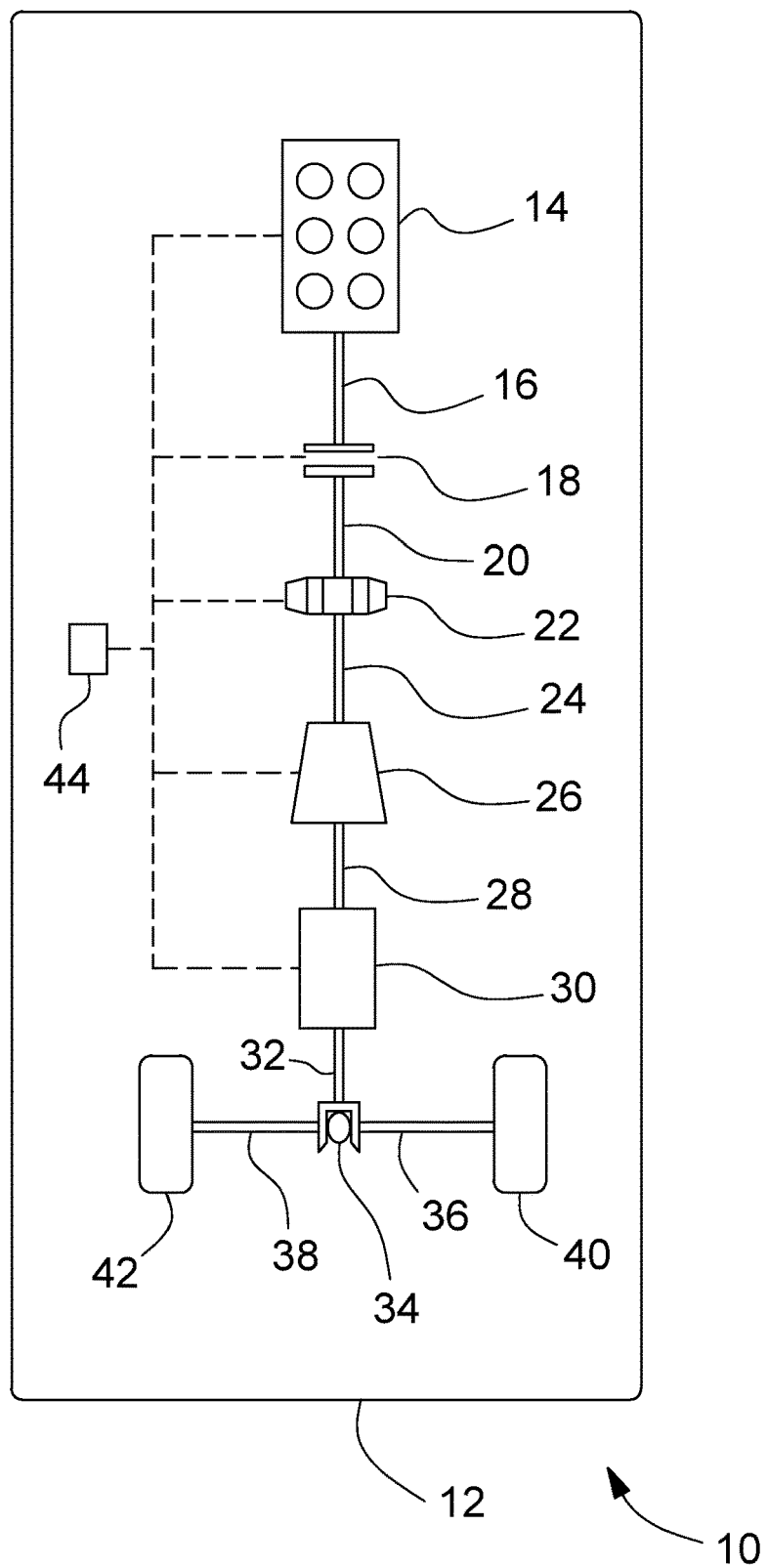
FIG. 1 is a schematic view of a hybrid electric powertrain.

FIG. 1 schematically illustrates a hybrid electric powertrain 10 for an automotive vehicle 12. This powertrain 10 is merely exemplary, and may take other forms, which may be front wheel drive, rear wheel drive, or all wheel drive types of powertrains. As described, the powertrain 10 is a parallel type hybrid electric powertrain but may also be another suitable powertrain known to one skilled in the art.

The powertrain 10 includes an internal combustion engine 14 powering a crankshaft 16. Interposed between the engine 14 and an electric machine 22, which may be an electric motor or motor/generator, is an engine disconnect clutch 18. When engaged, the clutch 18 connects the crankshaft 16 with an electric machine input 20 and transmits torque between the engine 14 and the machine 22. In turn, the machine 22 transmits torque to a torque converter 26 through a torque converter input 24 and the torque converter 26 transmits torque to a transmission 30 through a transmission input 28. The transmission 30 includes a plurality of gearings that are changeable to alter the input to output gear ratio, and hence rotational speed and torque output of the powertrain 10 by any suitable technique known to those skilled in the art. The transmission 30 turns a driveshaft 32 which in turn drives a differential 34. The differential 34 transmits torque to first and second axles 36 and 38, respectively, which drive first and second wheels 40 and 42, respectively. A controller 44 controls operation of the powertrain 10.

Figure 2:
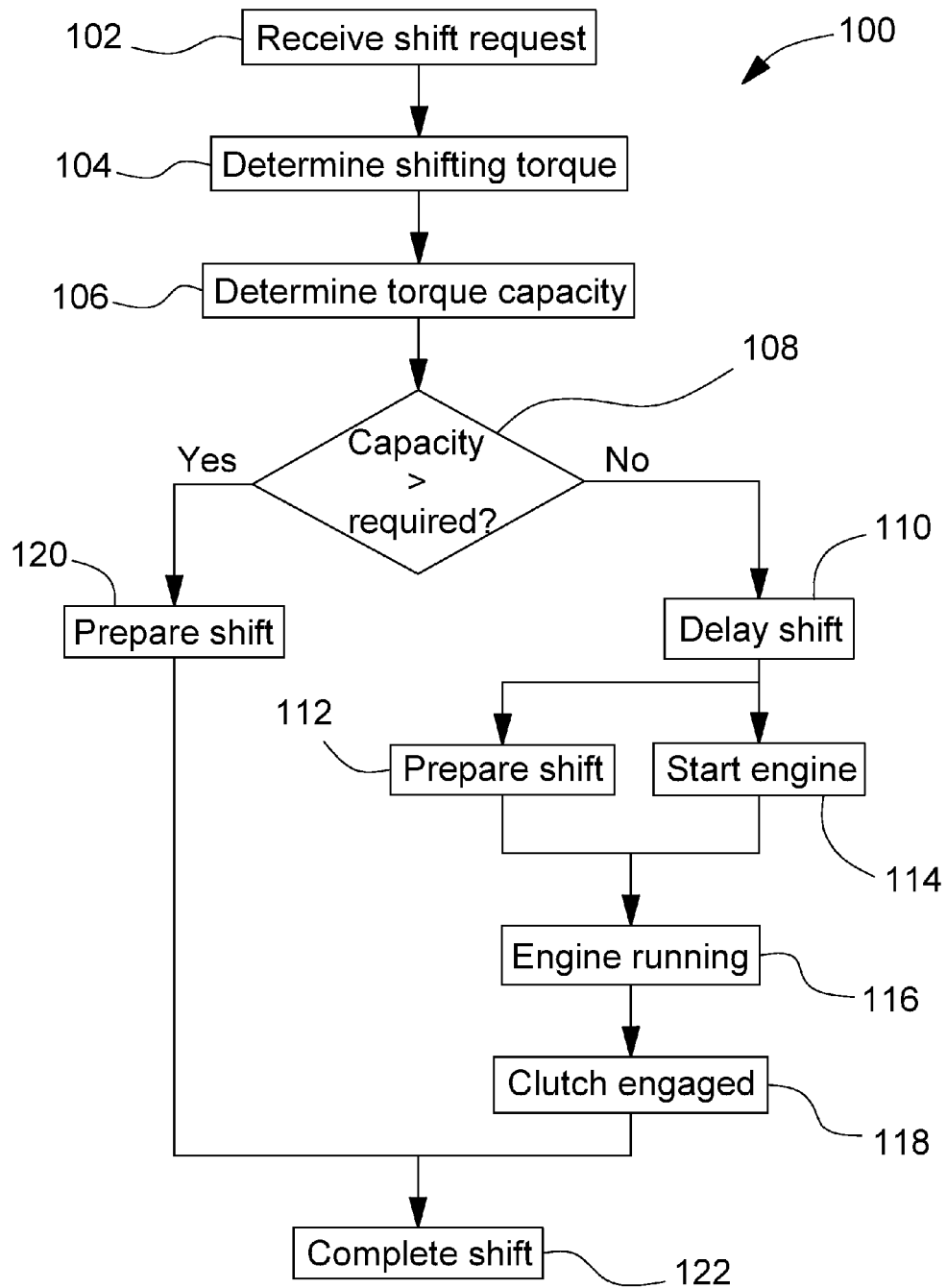
FIG. 2 is a flow chart of a control routine for a powertrain.

FIG. 2 will now be discussed with reference to FIG. 1. FIG. 2 illustrates a control routine 100 for the powertrain 10.

In a step 102, the controller 44 receives a shift request for the transmission 30 while the vehicle 12 is being propelled by the machine 22 with the engine 14 stopped. The shift request is made to shift the transmission 30 from a present gear ratio to a new gear ratio. The controller 44, in a step 104, determines a shifting torque to complete the transmission shift request and, in a step 106, a torque capacity of the machine 22. The shifting torque is a torque required for the transmission 30 to shift from the present gear ratio to the new gear ratio. The torque capacity of the machine 22 may include a torque reserve for starting the engine 14.

In a step 108, the controller 44 determines if the torque capacity is greater than the shifting torque. If the torque capacity is not greater than the shifting torque, then, in a step 110, the controller 44 delays completing the shift request. In a step 112, the controller 44 prepares the transmission 30 to complete the shift request. The shift request is prepared by reducing an off going clutch pressure for the present gearing to almost slipping and increasing an oncoming clutch pressure for the new gearing to just below a torque force in the transmission input 28. While the shift request preparation is completed, the controller 44 starts the engine 14 in a step 114. Once the engine is running in a step 116, the controller 44 engages the engine disconnect clutch 18 in a step 118. The shift request is then completed in a step 122.

If, in the step 108, the torque capacity is greater than the shifting torque, then, in a step 120, the controller 44 prepares the transmission 30 to complete the shift request. The shift request is then completed in the step 122.

Figure 3A:
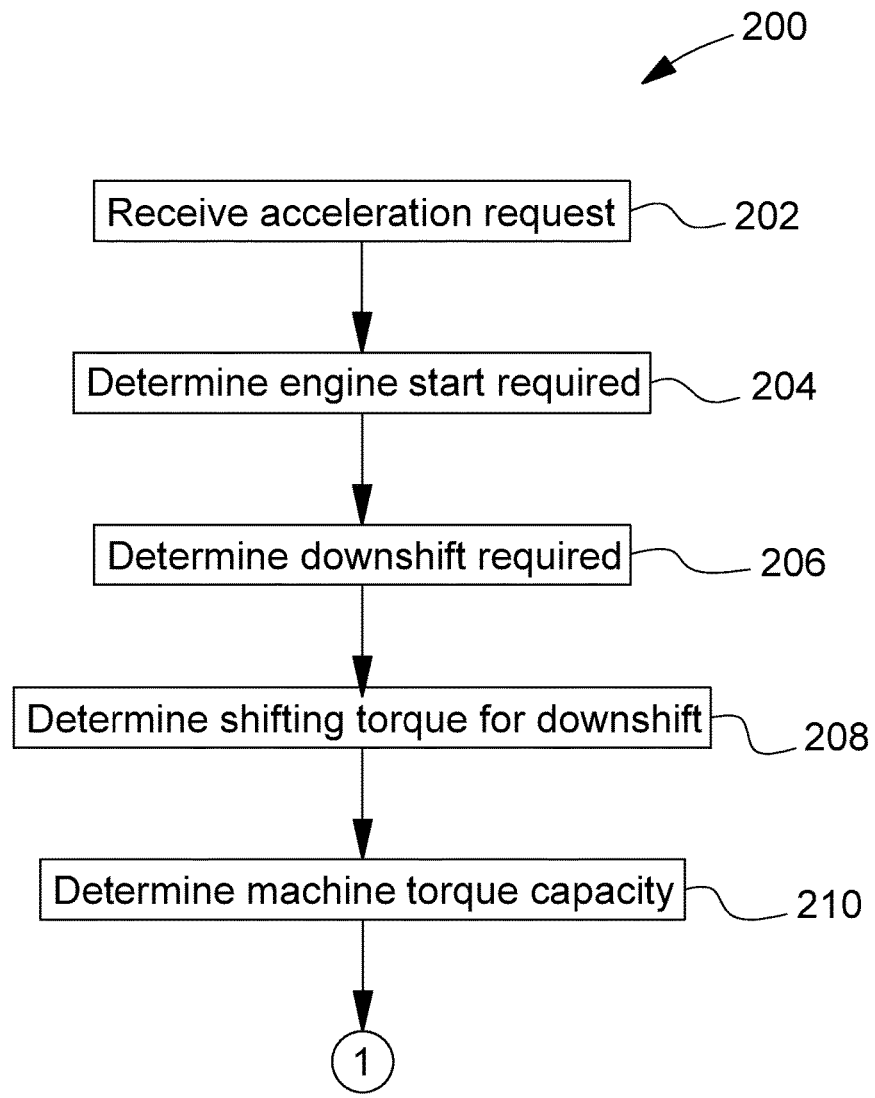
FIGS. 3a and 3b are a flow chart of a control routine for a powertrain.
Figure 3B:
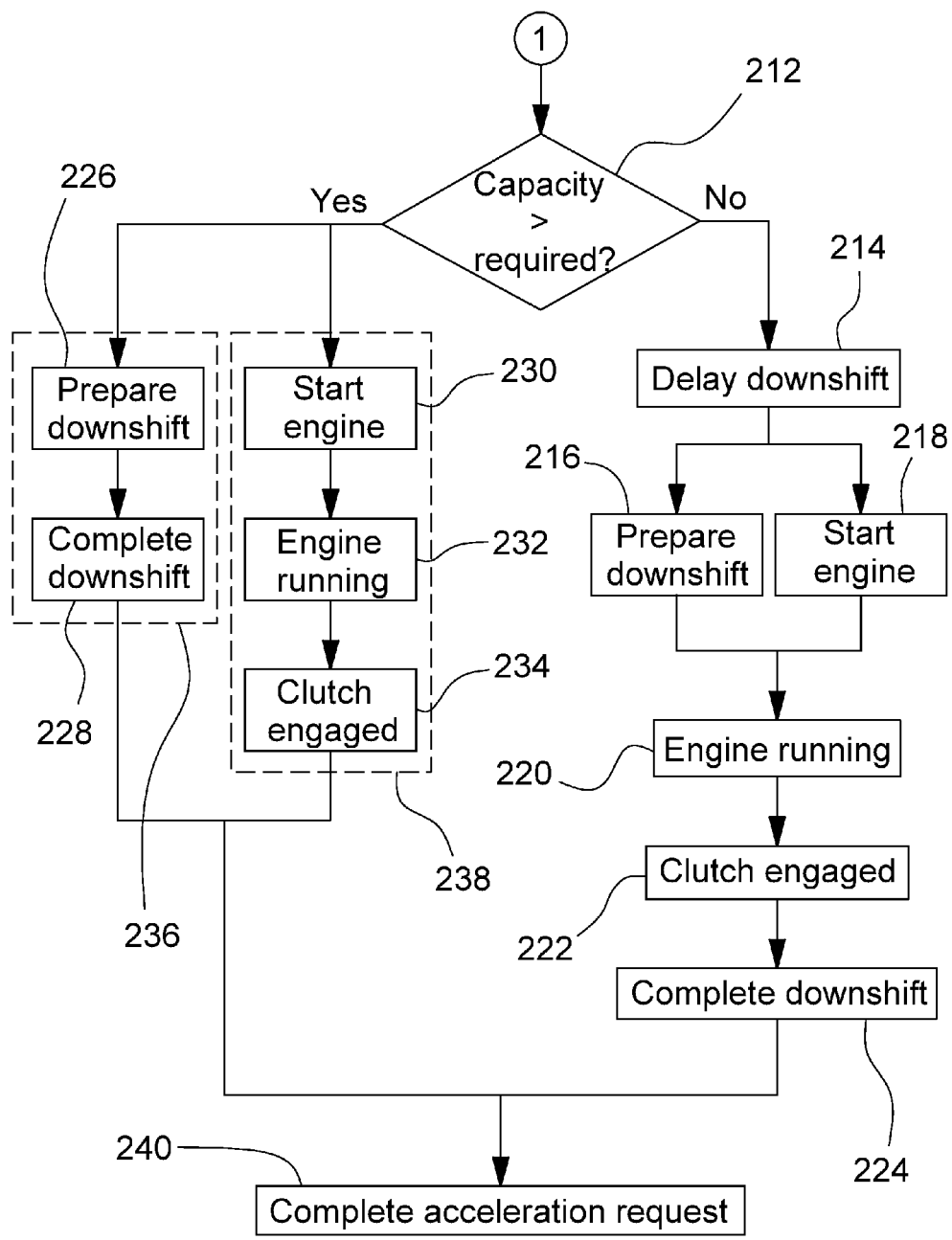

FIGS. 3a and 3b will now be discussed with reference to FIG. 1. FIGS. 3a and 3b illustrate a control routine 200 for the powertrain 10.

In a step 202, the controller 44 receives an acceleration request for the transmission 30 while the vehicle 12 is being propelled by the machine 22 with the engine 14 stopped. In a step 204, the controller 44 determines that starting the engine 14 is required to meet the acceleration request and in a step 206, the controller 44 determines that downshifting the transmission from a higher gearing to a lower gearing is also required to meet the acceleration request. In a step 208, the controller 44 determines a shifting torque to complete downshifting the transmission and, in a step 210, a torque capacity of the machine 22. The shifting torque is a torque required for the transmission 30 to change from the higher gear ratio to the lower gear ratio. The torque capacity of the machine 22 may include a torque reserve for starting the engine 14.

In a step 212, the controller 44 determines if the torque capacity is greater than the shifting torque. If the torque capacity is not greater than the shifting torque, then, in a step 214, the controller 44 delays completing the downshift. In a step 216, the controller 44 prepares the transmission 30 to downshift while also, in a step 218, starting the engine 14. The transmission 30 is prepared to downshift similarly to how the transmission 30 is prepared to shift for the control routine 100. Preparing to downshift the transmission 30 in step 216 may be simultaneous with starting the engine 14 in the step 218. After the engine 14 is running in a step 220, the clutch 18 is engaged to transmit torque in a step 222, and in a step 224, downshifting the transmission 30 is completed. Following downshifting the transmission 30, the acceleration request is completed in a step 240.

If, in the step 212, the torque capacity is greater than the shifting torque, then in a step 236 the controller 44 prepares the transmission 30 to downshift while, in a step 230, the engine 14 is started. The transmission 30 is downshifted in a step 228. Once the engine 14 is running in a step 232, the clutch 18 is engaged to transmit torque in a step 234. As illustrated, the steps 226 and 228 comprise a downshift subroutine 236 and the steps 230, 232, and 234 comprise an engine start subroutine 238. The downshift and engine start subroutines 236 and 238, respectively, may occur simultaneously. Following downshifting the transmission 30 in the step 228 and engaging the clutch 18 in the step 234, the acceleration request is completed in the step 240.

While certain embodiments of the present invention have been described in detail, those familiar with the art to which this invention relates will recognize various alternative designs and embodiments for practicing the invention as defined by the following claims.

The invention claimed is:

1. A method of controlling a hybrid powertrain comprising:
   receiving a transmission shift request while an electric machine, which is always drivingly connected to vehicle wheels, is propelling a vehicle and an engine is stopped; and
   timing completion of the shift request as a function of a torque capacity of the machine relative to a shifting torque required to complete the shift request.

2. The method of claim 1 wherein the engine remains stopped when the torque capacity is greater than the shifting torque and the shift request is completed by changing gearings of a transmission.

3. The method of claim 2 wherein the torque capacity is a full torque capacity of the machine.

4. The method of claim 2 wherein the torque capacity used to complete the shift includes a first torque amount to propel the vehicle and a second torque amount to start the engine.

5. The method of claim 1 wherein the engine is started when the torque capacity is not greater than the shifting torque and the shift request is completed by changing gearings of a transmission.

6. The method of claim 5 wherein completing the shift request comprises:
   maintaining a present gearing while reducing a first shift clutch pressure for a first transmission gear ratio, increasing a second shift clutch pressure for a second transmission gear ratio, and essentially simultaneously starting the engine; and
   engaging an engine disconnect clutch to transmit torque from the started engine to the motor while maintaining the present gearing; and
   completing the shift request while supplying torque from the machine and engine after the engine disconnect clutch is engaged.

7. The method of claim 1 wherein the shift request includes downshifting a transmission into a lower gearing.

8. A method of controlling a hybrid powertrain comprising:
   receiving an acceleration request while an electric machine is propelling a vehicle and an engine is stopped, where downshifting a transmission and starting the engine are needed to meet the acceleration request; and
   timing downshifting the transmission as a function of a torque capacity of the machine relative to a shifting torque required to downshift the transmission by changing transmission gearings.

9. The method of claim 8 wherein the torque capacity is greater than the shifting torque and the transmission is downshifted while the engine is started.

10. The method of claim 8 wherein, when the torque capacity is not greater than the shifting torque, the method further comprises:
    preparing to downshift the transmission while starting the engine;
    delaying completing downshifting the prepared transmission until the engine is providing an additional torque to supplement the torque capacity; and
    downshifting the transmission using the torque capacity and additional torque.

11. The method of claim 10 wherein the transmission is prepared to downshift by reducing a first shift clutch pressure and increasing a second shift clutch pressure while maintaining a present gearing.

\* \* \* \* \*